United States Patent [19]
Leverett

[11] 3,980,596
[45] Sept. 14, 1976

[54] PROCESS FOR REDUCING FILLER LOSS

[75] Inventor: Glenn Frederick Leverett, Vienna, W. Va.

[73] Assignee: E. I. Du Pont de Nemours and Co., Wilmington, Del.

[22] Filed: Apr. 11, 1975

[21] Appl. No.: 567,411

[52] U.S. Cl. .................. 260/23 XA; 260/29.6 F; 260/42.22; 260/42.24; 260/42.27; 260/42.54; 260/42.55
[51] Int. Cl.$^2$ ................. C08K 3/10; C08L 91/00
[58] Field of Search ......... 260/23 XA, 42.27, 42.55, 260/42.22, 42.24, 42.54

[56] References Cited
UNITED STATES PATENTS

| | | | |
|---|---|---|---|
| 3,781,258 | 12/1973 | Komentani et al. | 260/92.1 |
| 3,838,064 | 9/1974 | Vogt | 252/384 |
| 3,915,916 | 10/1975 | Leverett | 260/34.2 |

FOREIGN PATENTS OR APPLICATIONS 1,277,808  6/1972  United Kingdom

*Primary Examiner*—James H. Derrington

[57] ABSTRACT

The agglomeration of finely-divided granular tetrafluoroethylene polymer particles to produce agglomerated particles having improved flow properties is carried out by agitating the finely-divided particles in an aqueous dispersion containing a substantially water-immiscible organic liquid. The finely-divided particles can first be blended with particulate metal filler material and the blend agglomerated. The presence of a fatty acid or its salt while agitating the aqueous dispersion of the blend of the filler material and the finely-divided tetrafluoroethylene polymer effectively reduces loss of filler during the agglomeration procedure.

7 Claims, No Drawings

PROCESS FOR REDUCING FILLER LOSS

FIELD OF THE INVENTION

This invention relates to the agglomeration of blends of granular tetrafluoroethylene polymer particles and particulate metal fillers.

BACKGROUND OF THE INVENTION

The practice of agglomerating finely-divided granular tetrafluoroethylene polymer particles to increase their flowability while retaining their moldability properties is known. One method of agglomerating the finely-divided granular tetrafluoroethylene polymer particles is to agitate them in a two phase liquid medium of water containing an organic liquid that is capable of wetting the particles and which is soluble in water to at most only about 15% by weight at the operating temperature. The solubility requirement means that the organic liquid is substantially immiscible in water.

It is also known that blends of the finely-divided polymer particles and particulate filler materials can be agitated and agglomerated in the same manner. However, if the filler material is metallic, filler is lost to the aqueous phase during the agglomeration process.

Such loss is undesirable for several reasons. For example, quality standards are difficult to maintain since the loss can vary from batch to batch. Moreover, it is costly to recover lost filler from the aqueous phase and costly to be forced to use more filler than necessary in the initial blend in order to get approximately the right amount in the agglomerated product. In addition, the loss is visibly noticeable in the final molded product because of loss of filler from the surface of each agglomerated particle.

SUMMARY OF THE INVENTION

The invention described herein is a process for preparing agglomerated granules of granular tetrafluoroethylene polymers containing particulate metal-containing filler, which comprises agitating a mixture of finely-divided granular tetrafluoroethylene polymer particles, particulate metal-containing filler particles, and a fatty acid or its Group II metal salt, in a two-phase liquid medium of water and a substantially water-immiscible organic liquid; and separating the resulting agglomerated granules from the liquid medium. The process reduces loss of filler during agglomeration.

DESCRIPTION OF THE INVENTION

In general, the agglomeration of granular tetrafluoroethylene polymers is well known. The tetrafluoroethylene polymers used are unsintered, are of the granular type made by suspension polymerization (as distinguished from the "fine powder" type made from aqueous dispersion polymerization), and are non-melt-fabricable.

By tetrafluoroethylene polymer is meant the homopolymer of tetrafluoroethylene (PTFE) and copolymers thereof wherein the amount of comonomer present in polymerized form is small enough to maintain the non-melt-fabricable nature of the copolymer. Generally, this small amount will be less than about 2% by weight of the copolymer. The comonomer can be an ethylenically unsaturated copolymerizable monomer, such as a perfluoroalkene of 3-6 carbon atoms, e.g., hexafluoropropylene, or a perfluoro-(alkyl vinyl ether) of 3-6 carbon atoms, e.g., perfluoro-(propyl vinyl ether). These polymers are not melt-fabricable, i.e., they have an apparent melt viscosity of at least $1 \times 10^9$ poises at 380°C. The melt viscosity is measured according to American Society of Testing Materials Test D-1238-52T, modified as described following. The cylinder, orifice and piston tip are made of a corrosion-resistant alloy, Haynes Stellite 19, made by Haynes Stellite Co. The sample is charged to the 9.53 mm. inside diameter cylinder, which is maintained at 372°C. ± 1°C. Five minutes after the sample is charged to the cylinder it is extruded through a 2.1mm. diameter, 8mm. long orifice under a load (piston plus weight) of 5000 grams. This corresponds to a shear stress of 0.45 kilograms per $cm^2$. The melt viscosity in poises is calculated as 53,150 divided by the observable extrusion rate in grams per minute.

Tetrafluoroethylene polymer granules, as obtained from suspension polymerization, have an average diameter of about 1000 microns. For use in the agglomeration procedure, these granules are ground into finely-divided particles of an average particle size based on the number of particles of below about 200 microns and usually to about an average size of less than about 100 microns, for the ability to obtain agglomerates having good molding properties depends on the small initial particle size of the polymer to be agglomerated. The particle size will depend on the degree of grinding. Generally, the average size should be at least about 5 microns.

The substantially water-immiscible organic liquid used should have sufficient immiscibility with the water and sufficient wettability for the finely-divided tetrafluoroethylene polymer to cause formation of the agglomerates on agitation. Generally, the immiscible organic liquid can be soluble in water up to 15% by weight at the operating temperatures of the process. Preferably the solubility will be less than 1 percent. The organic liquid should be present in the water in an amount sufficient to provide a non-aqueous phase. The wettability of the organic liquid can be expressed through its surface tension, which should be no greater than about 40 dynes/cm at 25°C. Generally, the surface tension should be at least about 10 dynes/cm at 25°C. Examples of organic liquids useful herein include aliphatic hydrocarbons, such as pentane and dodecane; alicyclic hydrocarbons, such as cyclohexane or methyl cyclohexane; aromatic hydrocarbons, such as benzene, toluene or xylene; and halogenated hydrocarbons, such as tetrachloroethylene, trichloroethylene, chloroform or chlorobenzene; and the like. Generally, the hydrocarbons will contain no more than 12 carbon atoms. The organic liquid generally is present in an amount between 0.1 to 0.5 cc of the organic liquid per gram of tetrafluoroethylene/filler blend employed. The exact amount employed will influence the particle size of the agglomerated filled tetrafluoroethylene polymer.

The water can be demineralized if desired, but such is not necessary.

The particulate filler used herein is a metal-containing filler, such as powdered bronze, which can contain particles of other filler materials such as molybdenum sulfide. Such a filler will, however, be predominantly powdered bronze. These are commercially available fillers for filling resins. The filler may be present in an amount of from 5 to 40% by volume (which is equivalent to about 65% by weight) based on the volume of the tetrafluoroethylene and the filler. The filler should have an average size smaller than the size of the resultant agglomerates so that in the resultant agglomerates, which are usually of 250 to 1000 micron average particle size, the filler particles are largely enveloped by the polymer.

The fatty acid is a mono-carboxylic hydrocarbon acid containing between about 12 and about 20 carbon atoms. Its salt used herein is one in which the cation is a Group II metal of the Periodic Table, preferably zinc. The acid or its salt present in the mixture to be agitated can be present in an amount of between 0.01 part and 1 part per 1000 parts by weight of water present. Examples of such acids include lauric acid, palmitic acid, and stearic acid.

The order in which the ingredients of the mixture to be agglomerated are mixed together is not important. Usually, the water is heated to the desired temperature before adding the other ingredients.

The mixture will ordinarily contain from about 5 to about 30% by volume solids.

The mixture is slurried by agitation whereupon agglomeration of the initial blend occurs. The degree of agitation is not critical and can be varied to obtain particles of the size desired. The degree, temperature and time of agitation are interdependent, e.g., with more vigorous agitation, shorter times can be used. Generally, the mixture can be agitated for between about 5 and 120 minutes at a temperature of between about 0°C. and a temperature not high enough to cause boiling at the pressure used (usually about 90°C. where the pressure is atmospheric). For convenience, the agitation may ordinarily be carried out between 10°-90°C., and preferably between 25°-70°C. Pressure is not critical and the agitation is usually carried out at atmospheric pressure in an ordinary baffled treatment vessel. The agitation may be varied during the preparation, usually by reducing the agitation during the process, e.g., from agitation at a power of 7-16 kg.m./sec./l. to a power of 0.2-15 kg.m./sec./l., but such is not necessary.

Following agitation, the resulting agglomerated blend is separated from the liquid medium by filtration which removes mainly the water phase, followed by drying, preferably in equipment which permits recovery of the organic liquid. Although drying can be carried out at temperatures up to just below the sinter temperature of the tetrafluoroethylene polymer, drying is usually carried out at between 125°C. and 200°C.

The resulting dried agglomerates are useful for ram extrusion and for molding, e.g., in automatic molding equipment to mold articles which can be sintered to high quality shaped articles.

The invention is more specifically illustrated in the following examples.

In the examples the "standard specific gravity" (SSG) of the polytetrafluoroethylene is determined by water displacement of a standard molded test specimen based upon ASTM D-1457-69. The procedure employed comprises molding the test specimen by preforming a 12-gram sample of polytetrafluoroethylene powder at 8000 psi (352 kg/cm$^2$) in a mold 1⅛ inches in diameter (2.86 cm). The preform is placed in an oven preheated to 300°C. The temperature of the oven is then raised to 380°C. at the rate of 2°C. per minute. The temperature of the oven is maintained at 380°C. for 30 minutes and the oven is then cooled to 295°C. at a rate of 1°C. per minute. The temperature is maintained at 295°C. for 25 minutes after which the test specimen is removed, allowed to cool to room temperature and the specimen tested for specific gravity (ASTM 792-66).

The term "apparent density" (AD), as used herein, is measured by pouring 50 g of sample into a 100 cc graduated cylinder and the volume measured without tapping.

"Tensile strength" (TS) and "elongation" are determined in accordance with ASTM D-1457-69, but using the modified thermal cycle as described above under standard specific gravity.

"Average particle size" is determined by a dry sieving procedure, as follows:

The sieve set (7.62 cm.) is assembled in order, with the largest opening on top. The openings are:
18 mesh (1000 micron)
25 mesh (707 micron)
35 mesh (500 micron)
45 mesh (350 micron)
60 mesh (250 micron)
80 mesh (177 micron)
120 mesh ((micron)

10 grams of the powder to be tested, weighed to the nearest ± 0.01 gram, is charged to the top screen. The screen set is hand shaken for about 3 minutes.

After shaking, the weight of material retained on each sieve is determined to ± 0.01 gram. The cumulative percentage is calculated, as shown in the representative example following:

| Sieve | No. | Gross Wt. | Tare Wt. | Net Wt.×10 | Cumulative % |
|---|---|---|---|---|---|
| 18 | 1000 | 95.92 | 94.92 | 10 | 10.0 |
| 25 | 707 | 95.57 | 93.27 | 23 | 33.0 |
| 35 | 500 | 94.31 | 91.01 | 33 | 66.0 |
| 45 | 350 | 91.58 | 89.22 | 23.6 | 89.6 |
| 60 | 250 | 88.04 | 87.20 | 8.4 | 98.0 |
| 80 | 177 | 90.69 | 90.59 | 1.0 | 99.0 |
| 120 | 125 | 84.60 | 84.60 | 0 | 99.0 |
| 170 | 88 | | | | |
| 230 | 63 | | | | |
| 325 | 44 | | | | |
| Pan | | | | | |

The average particle size and size distribution are determined by plotting the cumulative percentage vs. size on log-probability paper. The average particle size is read from the plot at the 50 percentage abscissa.

The percent mold shrinkage (MS) is determined by measuring the diameter of the molded chip used to determine SSG after sintering, using the equation:

$$MS = \frac{\text{mold diameter-chip diameter}}{\text{mold diameter}} \times 100$$

The filler content of the product was determined by decomposing the polymer in a muffle furnace under nitrogen and weighing the remaining filler.

COMPARATIVE EXAMPLE A

Agitation was carried out in a stainless steel vessel 15.24 cm. in diameter and 20.32 cm. deep, equipped with two baffles 1.27 cm. wide. The stirrer used was 7.62 cm. in diameter, having 4 blades, each 1.27 cm. wide with a 45° downdraft pitch. 1200 ml. of water was charged to the vessel and heated to 70°C.

The organic liquid employed was perchloroethylene present in an amount of 35 ml.

The tetrafluoroethylene polymer used was polytetrafluoroethylene wherein the resin particles had an average size of about 35 $\mu$.

The filler used was spherical bronze having a particle

It is seen that the amount of filler retained in the agglomerated products is increased in the products of Examples 5–7 over that in the product of Comparative Example B.

TABLE I

| | | | | | | EXAMPLES Product Properties | | | |
|---|---|---|---|---|---|---|---|---|---|
| | Additive Acid or Salt | | Apparent Density | Average Particle | Standard Specific | Mold Shrinkage | Tensile Strength | Elongation | Weight % Filler in |
| Example | Type | g | g/l | Size, $\mu$ | Gravity | % | psi | % | Final Product |
| A | None | | 1610 | 730 | 3.846 | 1.77 | 2440 | 260 | 55.1 |
| 1 | Lauric Acid | 0.01 | 1610 | 650 | 3.890 | 1.77 | 2370 | 265 | 60.1 |
| 2 | Lauric Acid | 0.026 | 1610 | 650 | 3.890 | 1.68 | 2400 | 250 | 60.1 |
| 3 | Lauric Acid | 0.05 | 1610 | 650 | 3.890 | 1.68 | 2420 | 250 | 59.7 |
| 4 | Lauric Acid | 0.10 | 1560 | 640 | 3.907 | 1.68 | 2350 | 240 | 60.5 |
| B | None | | 1020 | 950 | 3.160 | 1.94 | 1600 | 71 | 44.2 |
| 5 | Zinc Stearate | 0.10 | 1350 | 860 | 3.771 | 1.41 | 1480 | 155 | 58.6 |
| 6 | Zinc Stearate | 0.50 | 1390 | 800 | 3.794 | 1.50 | 1340 | 126 | 58.4 |
| 7 | Zinc Stearate | 1.00 | 1350 | 850 | 3.776 | 1.77 | 1420 | 131 | 59.4 | size of about 20 $\mu$ in an amount of 60% by weight of the polytetrafluoroethylene filler blend. 200 gm. of the blend were used.

Agitation was started at 1000 rpm and continued for 15 minutes. After agitation, the agglomerated product was recovered by draining the mixture onto a screen and then drying in a vacuum oven at 140°C. Characteristics of the agglomerated product of this comparative Example are shown in Table 1.

EXAMPLES 1–4

These examples were carried out using the equipment, ingredients and procedures set forth in Comparative Example A, except that a certain amount of lauric acid (set forth in Table 1) was added first after the water reached 70°C. and the water/lauric acid mixture was mixed at 1000 rpm for 5 minutes before the other ingredients were added. Agitation was then continued for 15 more minutes. Characteristics of the agglomerated products are shown in Table 1. It is seen that the amount of filler retained in the product is increased in the products of Examples 1–4 over that in the product of Comparative Example A.

COMPARATIVE EXAMPLE B AND EXAMPLES 5–7

The equipment used was the same as used in Comparative Example A. 1200 ml. of water were charged to the vessel and heated to 50°C. The amount of zinc stearate indicated in Table 1 was then added along the 50 ml. of perchloroethylene and 200 g. of a blend of 55% particulate irregular bronze (U.S. Bronze type 401) and 5% molybdenum disulfide ("Molycote Z") in a granular polytetrafluoroethylene of an average particle size of about 35 $\mu$. The bronze filler average particle size was less than 100 $\mu$ and the molybdenum disulfide had an average size of 12 $\mu$. The mixture was agitated at 1000 rpm for 5 minutes and then the agitation speed was reduced to 800 rpm and continued for 25 minutes. The resulting agglomerated product was recovered from the water by drawing on a screen and drying at 120°C. under vacuum. Characteristics of the agglomerated products of these Examples are shown in Table 1.

The embodiments of the invention in which an exclusive property or privilege is claimed are defined as follows:

1. In the process for preparing filled agglomerated granules of non-melt-fabricable granular tetrafluoroethylene polymer in which the filler is a particulate metal-containing filler present in an amount of between about 5 and 40% by volume of the total volume, by agitating a finely-divided blend of said polymer and said filler in which the particle size of the finely-divided tetrafluoroethylene polymer averages numerically between about 5 microns and about 200 microns and in which the filler is present in an amount of between about 5 and 40% by volume, in a two-phase liquid medium consisting essentially of water and an organic liquid which is soluble in water up to at most 15% by weight at the operating temperature of the process and which has a surface tension no greater than about 40 dynes/cm. at 25°C., and in which the organic liquid is present in an amount of 0.1 to 0.5 cc per gram of said blend, followed by separating the resulting agglomerated granules from the liquid medium; the improvement wherein said liquid medium contains an additive selected from a monocarboxylic hydrocarbon acid containing between about 12 and about 20 carbon atoms or its salt in which the cation of the salt is a Group II metal of the Periodic Table, said acid or salt being present in an amount of between 0.01 and 1 part per 1000 parts by weight of water present.

2. The process of claim 1 wherein the filler is a bronze-containing filler.

3. The process of claim 2 wherein the agitation is carried out at a temperature of between 0° and 90°C., provided the temperature is not high enough to cause boiling of the liquid medium.

4. The process of claim 2 wherein the additive is the hydrocarbon acid defined therein.

5. The process of claim 4 wherein the acid is lauric acid.

6. The process of claim 2 wherein the additive is the salt of the hydrocarbon acid defined therein.

7. The process of claim 6 wherein the salt is zinc stearate.

* * * * *